United States Patent [19]

Dann et al.

[11] Patent Number: 4,862,278

[45] Date of Patent: Aug. 29, 1989

[54] VIDEO CAMERA MICROPHONE WITH ZOOM VARIABLE ACOUSTIC FOCUS

[75] Inventors: Lynn D. Dann, Rochester; Earl E. Rapp, Pittsford, both of N.Y.

[73] Assignee: Eastman Kodak Company, Rochester, N.Y.

[21] Appl. No.: 918,757

[22] Filed: Oct. 14, 1986

[51] Int. Cl.[4] .......... H04N 5/225

[52] U.S. Cl. .......... 358/225; 358/906; 352/27; 352/5

[58] Field of Search .......... 358/225, 906; 352/27, 352/5

[56] References Cited

U.S. PATENT DOCUMENTS

| | | | |
|---|---|---|---|
| 3,837,736 | 9/1974 | Ogiso et al. | 352/5 |
| 4,472,742 | 9/1984 | Hasegawa et al. | 358/227 |
| 4,531,822 | 7/1985 | Shenk | 354/401 |

*Primary Examiner*—Jin F. Ng

*Assistant Examiner*—Stephen Brinich

*Attorney, Agent, or Firm*—Robert M. Wallace

[57] ABSTRACT

In a video camera having a zoom lens and a microphone pickup for recording sound associated with the video images, the acoustic focus (or acoustic acceptance angle) of the microphone pickup is varied between unidirectional and omni-directional in synchronism with the zoom lens control of the camera in order to correlate the optical field of view of the lens with the acoustic field of view of the microphone for optimum coordination of picture and sound.

9 Claims, 2 Drawing Sheets

VIDEO CAMERA MICROPHONE WITH ZOOM VARIABLE ACOUSTIC FOCUS

BACKGROUND OF THE INVENTION

1. Technical Field

The invention is related to video recorders equipped with microphones for recording both video images and sound, particularly video "camcorders" of the type currently sold for home use having manual or automatic zoom telescopic lens capability.

2. Description of the Related Art

Video camcorders having zoom telescopic lens capability are well known in the art, such as the Kodak MVS 3460 video camcorder sold by Eastman Kodak Company, Rochester, New York. The zoom lens control enables the user to dramatically "zoom" in on a particular subject in the field of view. While this technique is particularly effective for highlighting various subjects in the recorded video program, there is no practical method in the art for effecting corresponding changes in the recorded sound.

Typically, such home camcorders are equipped with a microphone affixed to the camcorder characterized by a permanent acoustic acceptance angle or "field of view" corresponding to the acoustic focus of the microphone. Typically, the acoustic focus of the microphone is almost unidirectional. The dramatic effect of the zoom lens on the recorded image is not accompanied by any corresponding changes in the recorded sound.

As one example, when zooming in on one person conversing in a noisy crowd of other persons, it may be desirable to attenuate the sound received from all other persons in the crowd while highlighting the conversation of the one person being zoomed upon. Presently available camcorders intended for home use have no means of accomplishing this.

SUMMARY OF THE INVENTION

The present invention changes the acoustic focus of the microphone pickup on a camcorder in synchronism with the lens zoom control so as to coordinate the audio "field of view" with the optical field of view, so that a large swing in the zoom control results in a dramatic change in the recorded sound. In a first embodiment, the camera lens zoom control is linked to a reflective acoustic baffle mounted closely behind the microphone, and moves the baffle to change the acoustic focus of the microphone with any change in the zoom focus of the camera lens. In this manner, the microphone acoustic acceptance angle varies between an omnidirectional (wide) angle and a unidirectional (narrow) angle as the camera zoom lens magnification varies from closeup to telephoto. Preferably, the microphone acceptance angle corresponds to the field of view of the camera zoom lens at all times.

In a second, less expensive embodiment of the invention, an omnidirectional microphone and a unidirectional microphone are affixed to the camcorder, their outputs being proportionately applied through a variable potentiometer (controlled by the camera zoom lens control) to the recorder unit of the camcorder. The zoom lens control simply varies the position of the potentiometer in such a manner that the combined acoustical response of the combination of the two microphones changes in a continuum from omnidirectional to unidirectional as the camera zoom lens control varies from closeup to telephoto.

The advantage of the invention is that it provides dramatic changes in the focus of the sound corresponding to the dramatic changes in optical focus of the zoom lens without significantly increasing the production cost of the camcorder.

DESCRIPTION OF THE DRAWINGS

The invention may be understood by reference to the accompanying drawings of which.

DETAILED DESCRIPTION

Figure 1:
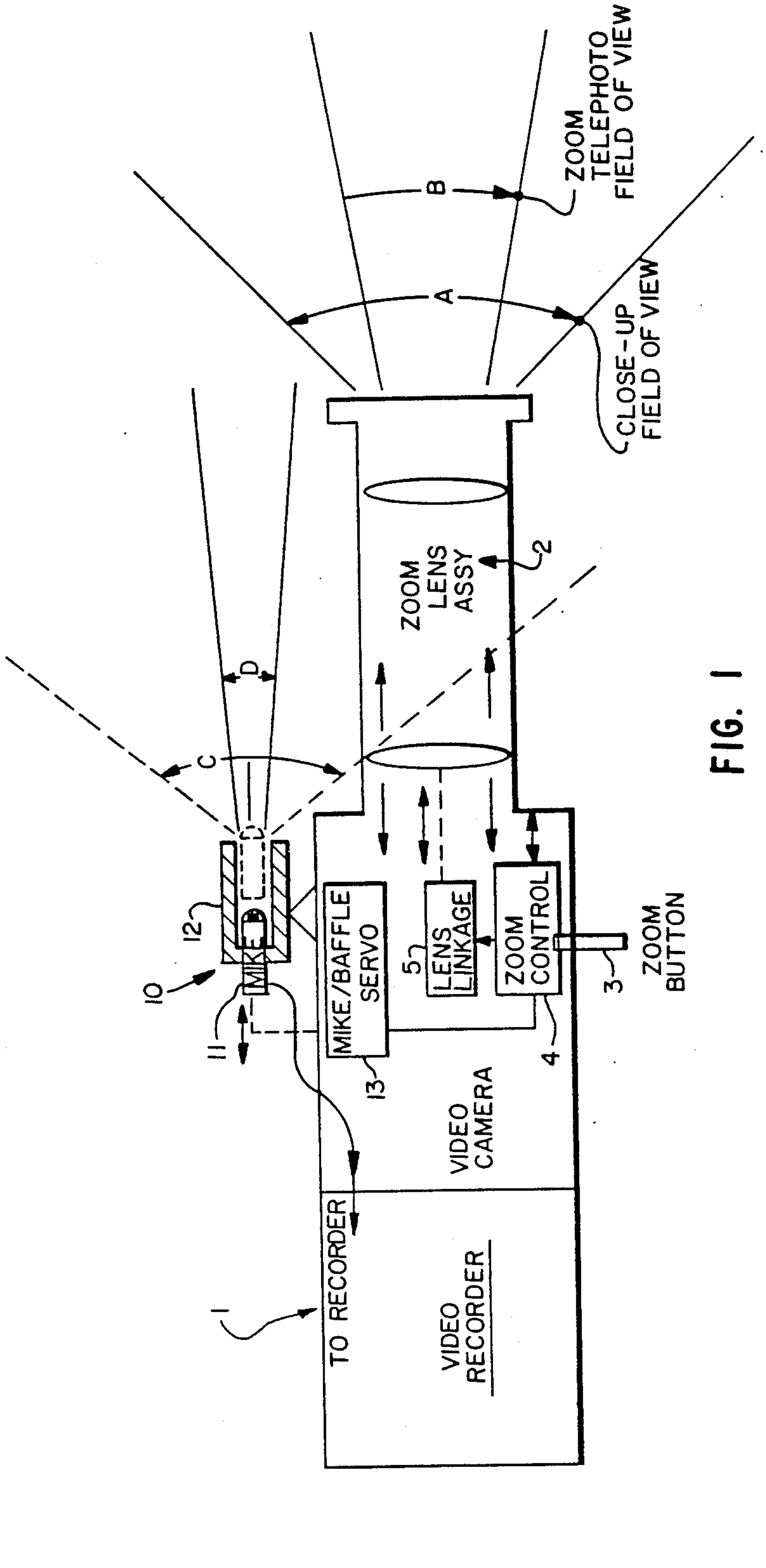
FIG. 1 is a simplified diagram of one embodiment of the invention.

Referring to FIG. 1, a combination video camera and audio/video recorder—or "camcorder"—1 includes a zoom lens assembly 2, a zoom button 3, a zoom control 4 attached to the zoom button 3, and zoom lens linkage 5 through which the zoom control 4 mechanically or electronically actuates the zoom lens assembly 2, in response to movement of the zoom button 3 by the camera user. The zoom lens assembly may be further controlled by an auto focus device of the type well-known in the art and which forms no part of the present invention. As the user moves the zoom button between its close-up and telephoto positions, the angle subtended by the optical field of view changes from A to B.

A microphone is mounted on the body of the camcorder 1 and includes a microphone 11 and an acoustical focussing baffle 12 surrounding the rear and sides of the microphone 11. In the invention, the microphone 11 and the acoustical baffle 12 are movable with respect to one another, at least one of them being movable with respect to the body of the camcorder 1 by means of a microphone/baffle servo 13. In the invention, the microphone/baffle servo 13 is controlled by the zoom control 4 in response to movement of the zoom button 3. When the microphone 11 extends slightly forward of the baffle 12 (as indicated in dashed line in FIG. 1), the microphone 11 has an effective sonic acceptance angle C, as illustrated in FIG. 1, corresponding to the close-up field of view angle A of the zoom lens assembly. When the microphone 11 is recessed deeply inside the baffle 12, its sonic acceptance angle changes to the narrow angle D of FIG. 1, corresponding to the telephoto field of view angle B of the zoom lens assembly. The zoom control 4 causes the microphone/baffle servo 13 to move the microphone into the baffle 12 as the zoom lens assembly is moved from the wide angle position to the telephoto position. Equivalently, rather than moving the microphone 11 in and out of the "cavity" of the baffle 12, the microphone 11 may be stationary with respect to the baffle 12, and the shape (or acoustic reflective pattern) of the baffle 12 may be varied to produce the same result.

Figure 2:
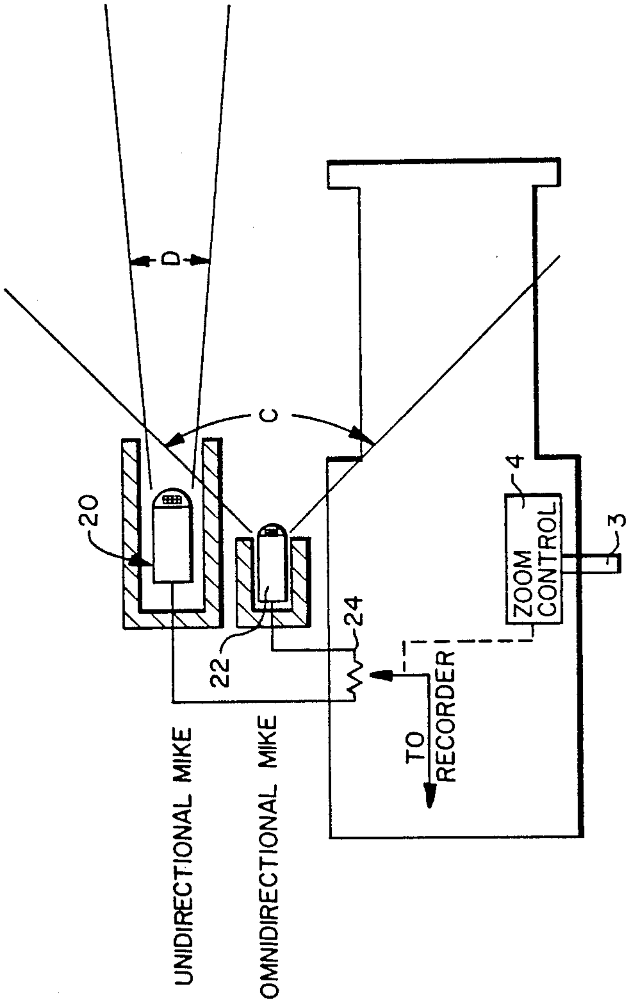
FIG. 2 is a simplified diagram of the preferred embodiment of the invention.

A simpler approach is illustrated in FIG. 2, in which the movable microphone/baffle servo 13 is eliminated. Instead, two microphones, a unidirectional microphone 20 and an omnidirectional microphone 22, are connected to two terminals of a potentiometer 24. The audio input of the video recorder is connected to a third terminal of the potentiometer 24, which third terminal is movable between the first two terminals. The zoom control 4 varies the position of the movable terminal of the potentiometer 24 in synchronism with movement of the zoom button 3. The omnidirectional microphone 22 is characterized by the wide sonic acceptance angle C while the unidirectional microphone 20 is characterized by the narrow sonic acceptance angle D.

Whenever the zoom control 4 moves the zoom lens assembly toward the wide angle position (corresponding to the wide field of view angle A), it simultaneously adjusts the movable terminal of the potentiometer 24 toward the "right-hand" position (with respect to the orientation of FIG. 2), wherein most of the audio signal transmitted to the recorder is from the omnidirectional microphone 22. Conversely, when the zoom control 4 forces the zoom lens assembly toward the telephoto position, it simultaneously adjusts the movable terminal of the potentiometer 24 toward the "left-hand" position, wherein most of the audio signal transmitted to the recorder is from unidirectional microphone 20. Thus, the potentiometer 24 is varied in a continuum with the position of the zoom lens assembly by the zoom control 4 in response to movement of the zoom button 3 in order to obtain the requisite mixture of sound from the two microphones 20, 22.

The advantage of the embodiment of FIG. 2 is that the combination of two permanent microphones of different acoustic acceptance angles with a potentiometer provides an "effective" acoustic acceptance angle (characteristic of the combined outputs of the two microphones) which may be varied in a continuum anywhere between the different acceptance angles of the two microphones for very low cost. Of course, the circuit of FIG. 2 may be realized using other analog or digital means instead of (or in addition to) the potentiometer 24 in order to obtain the same results.

While the invention has been described with particular reference to preferred embodiments thereof, it is understood that variations and modifications thereof may be made within the spirit and scope of the invention. For example, means may be provided enabling the user to change the degree to which the variation of the acoustical acceptance angle follows changes in the optical field of view. Furthermore, means may be provided enabling the user to disable, temporarily, the feature of this invention on his camcorder. Finally, the embodiment of FIG. 2 is not limited to just two microphones, but may be implemented with a plurality of microphones arrayed in a suitable manner.

Of course, the invention is not limited to video recorders or video cameras, nor does the microphone or acoustic pickup have to be attached to the camera body. Thus, the invention is equally useful with other kinds of imaging devices such as movie film cameras, and even cameras in which the microphone or microphone pickup is separate from the camera body.

What is claimed is:

1. An imaging system comprising:

means characterized by an optical acceptance angle for sensing an image;

means characterized by an effective acoustic acceptance angle for sensing sound;

means for varying said optical acceptance angle; and means, responsive to said optical acceptance angle varying means, for varying said effective acoustic acceptance angle in a corresponding manner, whereby changes in the field of view of said image sensing means are accompanied by corresponding changes in sound transmitted by said sound sensing means, wherein said optical acceptance angle varying means comprises a zoom lens controlling said optical acceptance angle, said imaging system further comprising a zoom lens control knob connected to said zoom lens for moving said zoom lens between wide angle and telephoto lens positions, wherein said sound sensing means comprises a microphone with a baffle adapted to control the acoustic focus of said microphone, wherein said effective acoustic acceptance angle varying means changes the relative location of said microphone and baffle whereby said microphone has a narrow focus whenever said zoom lens control knob holds said zoom lens in said telephoto position, and has a wide acoustic focus whenever said zoom lens control knob holds said zoom lens in said wide angle position.

2. The imaging system of claim 1 wherein said sound sensing means comprises first and second microphones characterized by wide and narrow acoustic acceptance angles.

3. The imaging system of claim 2 wherein said effective acoustic acceptance angle varying means comprises a potentiometer connected between two said microphones.

4. The imaging system of claim 2 wherein said first and second microphones comprise omnidirectional and unidirectional microphones, respectively.

5. In a camera and recorder combination characterized by an optical field of view having means characterized by an effective acoustic acceptance angle for sensing an acoustic signal, the improvement comprising means for varying said effective acoustic acceptance angle while varying said optical field of view simultaneously, wherein said acoustic sensing means comprise a microphone and an acoustically reflective baffle adjacent said microphone, and wherein said acoustic acceptance angle varying means comprise means for changing the relative location of said baffle and said microphone.

6. The camera and recorder combination of claim 5 wherein said acoustic sensing means comprise first and second acoustic pick-ups characterized by first and second acoustic acceptance angles, respectively, both pick-ups being connected to said recorder through two respective terminals, and wherein said acoustic acceptance angle varying means comprise means for apportioning the respective impedances between said two terminals and said recorder.

7. In a system comprising a camera including an image sensor characterized by an optical field of view with means for changing said optical field of view, and an acoustic sensor characterized by an acoustic field pattern, the improvement comprising means responsive to said field of view changing means for changing said acoustic field pattern simultaneously therewith, wherein said acoustic sensor comprises a pair of acoustic pickups characterized by different acoustic acceptance angles, and wherein said acoustic pattern pattern changing means comprise means for proportionately selecting the outputs of said pickups.

8. The system of claim 7 wherein said acoustic sensor comprises a pair of acoustic pickups characterized by different acoustic acceptance angles, and wherein said acoustic pattern changing means comprise means for proportionately selecting the outputs of said pickups.

9. The system of claim 7 wherein said acoustic sensor comprises a microphone and a baffle adjacent said microphone, and wherein said acoustic pattern changing means comprise means for changing or moving the acoustic reflective pattern of said baffle.

* * * * *